S. C. RAYBON.
DRIVING GEAR CASING FOR BICYCLES.
APPLICATION FILED JUNE 15, 1918.
1,325,206.
Patented Dec. 16, 1919.
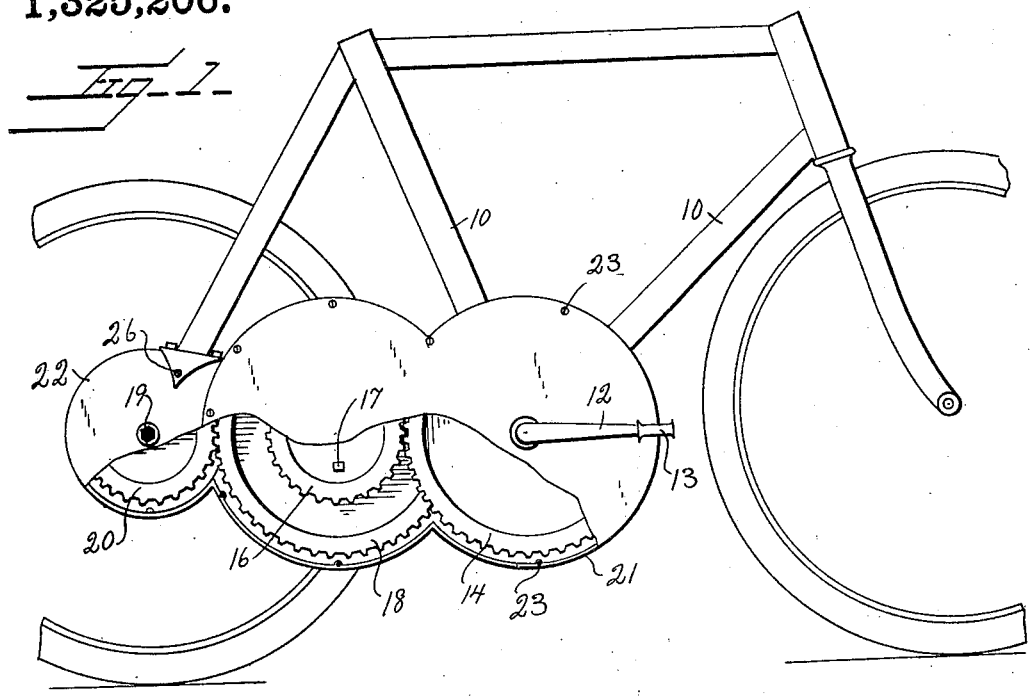
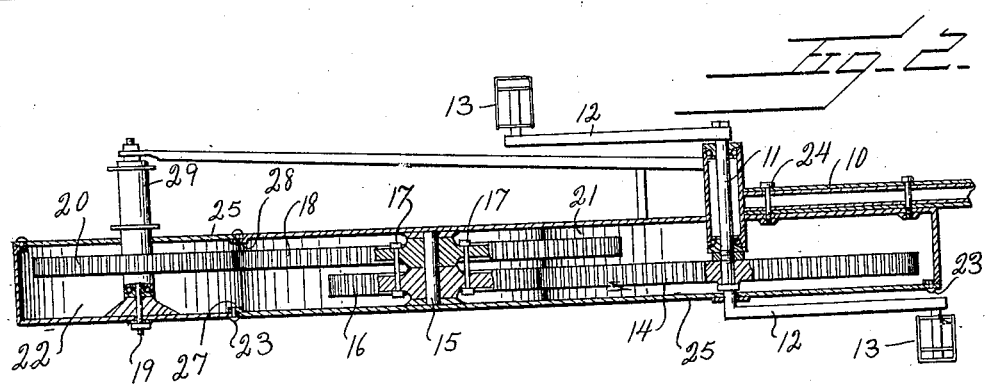
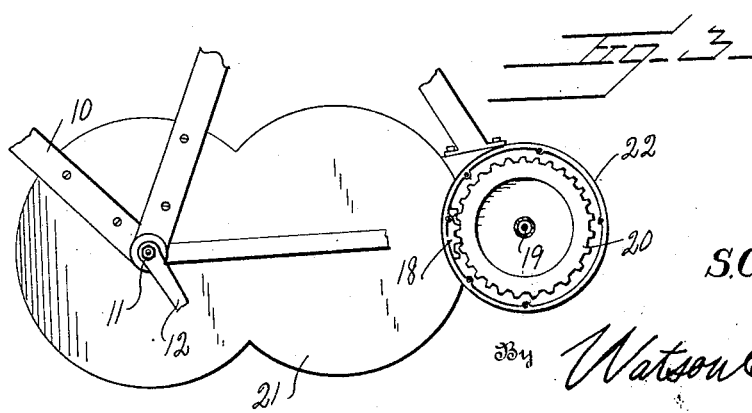
Inventor
S. C. Raybon
By Watson E. Coleman
Attorney

UNITED STATES PATENT OFFICE.

SIDNEY C. RAYBON, OF DAWSON, GEORGIA.

DRIVING-GEAR CASING FOR BICYCLES.

1,325,206.  Specification of Letters Patent.  Patented Dec. 16, 1919.

Application filed June 15, 1918. Serial No. 240,122.

*To all whom it may concern:*

Be it known that I, SIDNEY C. RAYBON, a citizen of the United States, residing at Dawson, in the county of Terrell and State of Georgia, have invented certain new and useful Improvements in Driving-Gear Casings for Bicycles, of which the following is a specification, reference being had to the accompanying drawings.

This invention relates to bicycles, and particularly to the means for transmitting power from the crank shaft of the bicycle to the driving wheel thereof.

The general object of the invention is to provide a transmission mechanism of this character so designed that the bicycle will run very easily, will have a long life by reason of its durability, the transmission gear providing for securing a high speed to the driving wheel of the bicycle relative to the pedals.

A further object is to provide a construction of this kind in which the transmission gears are entirely housed and protected from the elements, the housing being such that the gears may run in oil.

Other objects will appear in the course of the following description.

My invention is illustrated in the accompanying drawings, wherein:—

Figure 1 is a fragmentary side elevation of my improved transmission gear, the housing being broken away;

Fig. 2 is a longitudinal sectional view of the housing, the gears being shown in plan view, and Fig. 3 is a fragmentary side elevation of the transmission gear and housing looking at the side opposite to that shown in Fig. 1 and with the covering plate of the housing 22 removed.

Referring to the drawing, 10 designates the frame of a bicycle and 11 the crank shaft thereof operatively mounted therein in the usual manner and provided with the cranks 12 carrying pedals 13. Mounted on the crank shaft to rotate therewith is a gear wheel 14 which, in practice, will be approximately 12″ in diameter. Mounted upon the frame, in any suitable manner, is an intermediate shaft 15 carrying upon it a relatively small gear wheel 16 which intermeshes with the gear wheel 14 and mounted upon this shaft 15 and preferably connected to the gear wheel 16 in any suitable manner as by the bolts 17 is a relatively large gear wheel 18. This overlaps the gear wheel 14 and is disposed to one side thereof.

Mounted upon the frame of the bicycle at the rear thereof is a rear axle 19 and carried upon this rear axle is a gear wheel 20 which meshes with the gear wheel 18. Preferably the gear wheel 18 will be 12″ in diameter, while the gear wheel 20 is approximately 6½″ in diameter. The gear wheel 16 is also approximately 6½″ in diameter. It will thus be seen that the rear axle will be driven about four times as fast as the crank shaft.

The gear wheels 14, 16, 18 and 20 are all housed. The gear wheels 14 and 18 and the gear wheel 16 are inclosed in a housing 21. The gear 20 is inclosed within a housing 22. Both housings are secured in place by bolts 24. The housing 21 is connected to the central part of the frame while the housing 22 is connected on the rear part of the frame. It will be seen that with this construction a very easy transmission is secured between the crank shaft and the axle of the rear wheel. Inasmuch as the gears are entirely housed they are protected from the effects of dampness and at the same time may run in oil if desired so that the gears will last much longer than exposed gears. Furthermore, they will last much longer than the ordinary sprocket wheel axle used, while at the same time the ratio of speed is greatly increased between the crank shaft and the rear axle.

It will be seen from the drawings that the housings 21 and 22 are connected to the frame so that they are removable from the frame in opposite directions. To remove the housings in this manner it is first necessary to remove the coaster brake hub 29 from the frame of the bicycle, after which the bolts or rear right hand plate 25 of the rear housing is removed, by first removing the securing bolts which hold the plate in place. In fact, this plate 25 and the coaster brake hub 29 are removed together, as is also the gear 20. This gear 20 is carried by the coaster brake hub. To remove the coaster brake hub, it is necessary to remove the rear axle 19, by first detaching the nut that holds the rear axle in place. After removing the coaster brake hub together with the plate 25 and the gear 20, the rear housing 22 may be removed in the opposite direction, that is, to the right of the frame of the bicycle. The forward right hand plate 25 of the forward housing may then be removed from the right of the bicycle frame, by removing the bolts or screws 23 of the forward part of the housing. This may be done by first removing the nut on the crank shaft 11, and then detaching the pedal bar 12 on the left side of the frame of the bicycle, then the crank shaft 11 may be removed from its bearings to the right of the bicycle frame. When removing the crank shaft 11 in this manner, the forward gear 14 is also removed with the shaft. In this way, it will be seen that one part of the forward portion of the housing may be removed in one direction; while an opposite rear part of the rear portion of the housing may be removed in the opposite direction, thereby allowing the gear connections between the crank shaft and the coaster brake hub to be easily and quickly cleaned, or otherwise repaired. When the forward right hand plate 25 is removed together with the gear 14, it is possible to detach the bolts 24 (which secure the housing to the bicycle frame), whereby the remaining part of the housing may be removed from the bicycle frame. Thus the housing 21 is connected to the frame 10 by the bolts 24, and both the housings 21 and 22 have removable plates 25 held in place by bolts 23. The housing 22 is held to the rear end of the frame by screws 26 and it will be seen that the wall of the housing 22 is provided with a flange 27 engaging with the adjacent wall of the housing 21, while the removable plate 25 of the housing 22 is supported by means of a flange 28 on the wall of the housing 21. It will be seen that the coaster brake hub 29 extends out through the plate 25. It is necessary that the housing should bolt on from right side for the rear gear wheel 20 is mounted on the rear coaster brake hub and when it is necessary to change a tire or repair worn parts of the brake, the rear wheel would have to be disconnected from the frame and the housing being connected on the right side, as shown in Fig. 3, provides the quickest way of taking the wheel off.

While I have illustrated a form of my invention which I believe to be entirely practical and effective, yet it is obvious that changes in detail may be made without departing from the spirit of the invention and that I may use more transmission gears than illustrated, and that these transmission gears may have different ratios than illustrated.

Having described my invention, what I claim is:

1. In a housing for the driving means of a bicycle, the combination with a frame, of driving and driven members, the former being mounted in a bearing of the central portion of the frame, the latter being mounted in a bearing at the rear of the frame, an elongated housing, comprising a forward part having spaced sides, one being secured to the side of the frame, the other being detachably fastened to the side which is secured to the frame and having a bearing for the driven member, the rear part of the housing comprising opposite spaced sides having bearings for the driven member and being detachably connected at their rear parts whereby they are separable, one in one direction, and the other in the opposite direction, the forward parts of the opposite sides of the rear housing being detachably connected to the rear portions of the opposite sides of the forward housing, and means supported in bearings of the forward housing intermediate the driving and driven members and having operative connections with said driving and driven members.

2. In a device as set forth, the combination with a bicycle frame having driving and driven members, the former being mounted in bearings centrally of the frame, the latter being mounted in bearings at the rear of said frame, of a pair of housings, one having bearings for the driven member at the rear, the other being in advance of the housing at the rear, the two housings being detachably connected, the forward housing being secured to one side of the frame and having a section cover plate detachably secured thereto, said cover plate having a bearing for the driving member, the rear housing being removable to one side of the frame in a direction laterally from the forward housing, a cover plate connected to the rear housing and being removable in an opposite direction and having a bearing for the driven member, whereby as the said last mentioned cover plate is removed, the driven member is removed therewith, gear connections between the driving and driven members, and means positioned between the driving and driven members and mounted in bearings of the forward housing and its cover plate for supporting the intermediate parts of the gear connections.

In testimony whereof I hereunto affix my signature in the presence of two witnesses.

SIDNEY C. RAYBON.

Witnesses:
GAY RAINES,
C. C. MARTIN.